United States Patent [19]

Colles et al.

[11] Patent Number: 4,496,995
[45] Date of Patent: Jan. 29, 1985

[54] DOWN CONVERTING A HIGH FRAME RATE SIGNAL TO A STANDARD TV FRAME RATE SIGNAL BY SKIPPING PRESELECTED VIDEO INFORMATION

[75] Inventors: Joseph H. Colles, Oceanside; James A. Bixby, San Diego, both of Calif.

[73] Assignee: Eastman Kodak Company, Rochester, N.Y.

[21] Appl. No.: 363,319

[22] Filed: Mar. 29, 1982

[51] Int. Cl.³ .................... H04N 5/92; H04N 5/782
[52] U.S. Cl. ........................ 360/9.1; 360/11.1; 360/33.1; 358/335
[58] Field of Search ............... 360/9.1, 11.1, 33.1; 358/335, 140, 337

[56] References Cited

U.S. PATENT DOCUMENTS

| | | |
|---|---|---|
| 2,940,005 | 6/1960 | Toulon . |
| 3,911,467 | 10/1975 | Levine et al. . |
| 3,958,077 | 5/1976 | Ross et al. . |
| 4,057,836 | 11/1977 | Munsey . |
| 4,064,540 | 12/1977 | Jetten . |
| 4,125,862 | 11/1978 | Catano . |
| 4,127,877 | 11/1978 | Morishita et al. . |
| 4,133,009 | 1/1979 | Kittler et al. ............ 360/11.1 |
| 4,204,227 | 5/1980 | Gurley . |
| 4,240,113 | 12/1980 | Michael et al. . |
| 4,280,151 | 7/1981 | Tsunekawa et al. ........ 360/9.1 |
| 4,395,738 | 7/1983 | Hedlund et al. ........... 360/9.1 |

FOREIGN PATENT DOCUMENTS 2751274  5/1979  Fed. Rep. of Germany .

OTHER PUBLICATIONS

IBM Technical Disclosure Bulletin, vol. 16, No. 7, Dec. 1973, pp. 2169–2171, (J. E. Mayes and A. L. Snover).

Primary Examiner—Raymond F. Cardillo, Jr.
Attorney, Agent, or Firm—Robert F. Cody

[57] ABSTRACT

In a fast frame recorder having (1) a video camera adapted to produce signals corresponding to a variety of frame rates, (2) a variable speed tape recorder adapted to down-convert the frame rate of the camera signals to a reference frame rate by appropriately reducing the recorder tape speed to a reference speed, and (3) a display monitor adapted to receive the reference frame rate signals, the camera thereof may be adjusted for various scene and frame rate conditions without need to record the camera frame rate signals (for purposes of signal down-conversion). This is, in accordance with the invention, achieved by selecting a certain line (or lines) from each frame of the camera output signal, and applying such selected lines directly to the display monitor. Skipping from line to line in the camera output signal has the effect of down-converting the frame rate of the camera output signal as required. Thus, tape recording for camera set-up purposes is obviated and, attendantly, the camera may be operated at any selected rate while, at the same time, the camera optics, scene lighting, etc., may be adjusted to optimize the monitor display.

13 Claims, 17 Drawing Figures

FIG. 6a

| SPEED REDUCTION | CAMERA FRAME RATE (fps) | N | RECORD TAPE SPEED (ips) | PLAYBACK TAPE SPEED (ips) |
|---|---|---|---|---|
| 33 | 2,000 | 1 | 200 | 6 |
| 17 | 1,000 | 2 | 100 | 6 |
| 8 | 500 | 4 | 50 | 6 |
| 3 | 200 | 10 | 20 | 6 |
| 1 | 60 | 33 | 6 | 6 |

FIG. 6b

| N | fc (MHz) (RECORD) | Δf (MHz) (RECORD) |
|---|---|---|
| 1 | 5 | 1.6 |
| 2 | 2.5 | 0.8 |
| 4 | 1.25 | 0.4 |
| 10 | 0.5 | 0.16 |
| 33 | 0.15 | 0.05 |

FIG. 6c

| | | RECORD | | | PLAYBACK | | |
|---|---|---|---|---|---|---|---|
| SPEED REDUCTION | FRAME RATE (fps) | fc (MHz) | Δf (MHz) | TAPE SPEED (ips) | TAPE SPEED (ips) | fc (MHz) | Δf (MHz) | FRAME RATE (fps) |
| 33 | 2,000 | 5 | 1.6 | 200 | 6 | 0.15 | 0.05 | 60 |
| 17 | 1,000 | 2.5 | 0.8 | 100 | 6 | 0.15 | 0.05 | 60 |
| 8 | 500 | 1.25 | 0.4 | 50 | 6 | 0.15 | 0.05 | 60 |
| 3 | 200 | 0.5 | 0.16 | 20 | 6 | 0.15 | 0.05 | 60 |
| 1 | 60 | 0.15 | 0.05 | 6 | 6 | 0.15 | 0.05 | 60 |

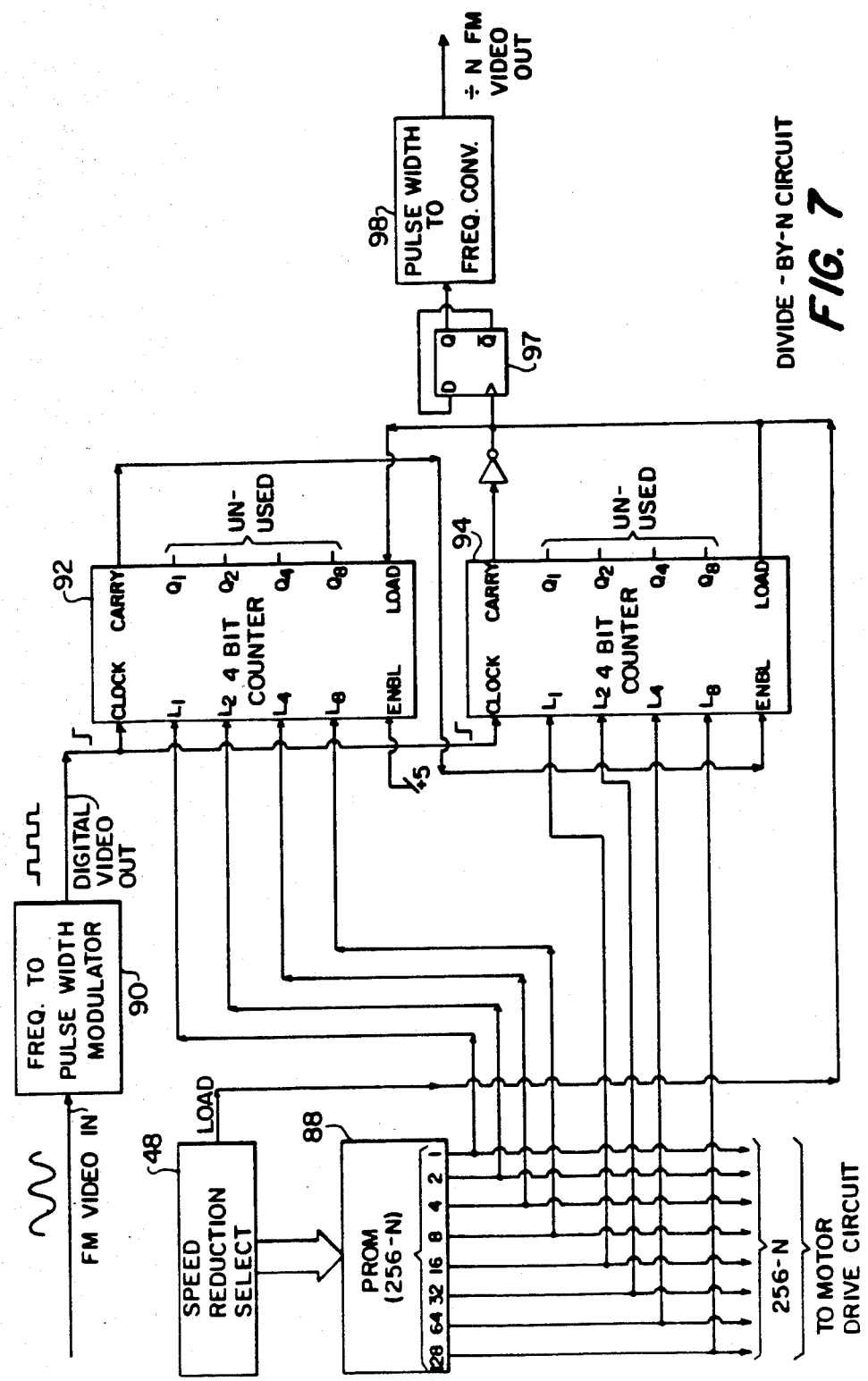
FIG. 7 DIVIDE-BY-N CIRCUIT

PHASE LOCK LOOP MOTOR DRIVE CIRCUIT

FIG. 12

CAMERA SET UP AT 1920 FPS *

| SET UP MONITOR | | | |
|---|---|---|---|
| B1,C1,L1 | B1,C2,L1 | B1,C3,L1 | B1,C240,L1 |
| B2,C1,L2 | B2,C2,L2 | B2,C3,L2 | B2,C240,L2 |
| B3,C1,L3 | B3,C2,L3 | B3,C3,L3 | B3,C240,L3 |
| ⋯ | ⋯ | ⋯ | ⋯ |

FRAME 1

| B192,C1,L32 | B192,C2,L32 | B192,C3,L32 | B192,C240,L32 |
| B193,C1,L1 | B193,C2,L1 | B193,C3,L1 | B193,C240,L1 |
| B194,C1,L2 | B194,C2,L2 | B194,C3,L2 | B194,C240,L2 |
| ⋯ | ⋯ | ⋯ | ⋯ |

FRAME 2

| B384,C1,L32 | B384,C2,L32 | B384,C3,L32 | B384,C240,L32 |
| ⋯ | ⋯ | ⋯ | ⋯ |

FRAME 3 ETC.

\* WHILE SPECIFICATION SOMETIMES SAYS "2000 FPS", ACTUAL FRAME RATE IS 1920 FPS.

CAMERA SET UP AT 960 FPS

| SET UP MONITOR | | | |
|---|---|---|---|
| B1,C1,L1 | B1,C2,L1 | B1,C3,L1 | B1,C240,L1 |
| B1,C1,L2 | B1,C2,L2 | B1,C3,L2 | B1,C240,L2 |
| B2,C1,L3 | B2,C2,L3 | B2,C3,L3 | B2,C240,L3 |
| B2,C1,L4 | B2,C2,L4 | B2,C3,L4 | B2,C240,L4 |
| ... | ... | ... | ... |
| B96,C1,L191 | B96,C2,L191 | B96,C3,L191 | B96,C240,L191 |
| B96,C1,L192 | B96,C2,L192 | B96,C3,L192 | B96,C240,L192 |

FRAME 1

| B97,C1,L1 |
|---|
| B97,C1,L2 |

FRAME 2

FIG. 13

DOWN CONVERTING A HIGH FRAME RATE SIGNAL TO A STANDARD TV FRAME RATE SIGNAL BY SKIPPING PRESELECTED VIDEO INFORMATION

BACKGROUND OF THE INVENTION (1) Field of the Invention

This invention relates to fast frame recorder apparatus for providing slow motion replay and, more particularly, to a technique and apparatus for facilitating the set-up of an electronic camera useful with such apparatus.

(2) Description Relative to the Prior Art

Motion analysis apparatus using a fast frame recorder—by which scenes are recorded on magnetic tape at one tape speed and replayed in slow motion at a different tape speed—is known. See *Research Disclosure,* Item No. 19919, Vol. 199, November 1980, published by Industrial Opportunities Ltd., Homewell, Havant, Hampshire, P09 1EF, United Kingdom and/or U.S. Pat. Nos. 4,322,638, filed on Jan. 16, 1980; 4,322,752, filed on Jan. 16, 1980; 4,330,846, filed on Jan. 30, 1980; U.S. Ser. No. 159,421, filed on June 16, 1980; U.S. Pat. Nos. 4,342,057, filed on June 16, 1980; 4,339,775, filed on June 16, 1980 and U.S. patent application Ser. No. 172,915, filed on July 28, 1980. Such fast frame recorder is comprised of a number of major components among which are a video camera having a solid state imager, a tape recorder, and a cathode ray tube (CRT) display monitor. The camera is capable of producing signals corresponding to selected frame rates of from 60 to about 2,000 per second; the tape recorder, by recording at one tape speed and appropriately slowing down the tape during playback to a certain predetermined speed, down-converts the camera signals, regardless of the camera frame rate, to a nominal frame rate of 60 per second; the CRT display monitor receives the 60 per second frame rate playback signal from the tape recorder and displays the scene is question at an appropriate slow motion depending upon the selected camera frame rate.

The quality of the image displayed on the CRT monitor is affected by a variety of "interrelated" conditions among which are (1) the illumination of the scene that was recorded by means of the camera, (2) the camera focus and depth of field, and (3) the selected frame rate at which the camera was operated. This may be appreciated from, among other things, a realization that at 2,000 frames per second, significantly more scene illumination is necessary than at, say, 60 frames per second, if for no other reason than to produce sufficient charges at the pixel sites of the solid state sensor within the video camera. Too few charges will affect the scene recording one way; too many charges will affect the scene recording a different way. Thus, it had been the practice to implement one of two camera set-up procedures to provide for a good playback display on the CRT monitor. In the first set-up procedure, the camera is run at the selected frame rate, its signal being recorded, down-converted to 60 frames per second, and then played back through the CRT monitor. In the event the display on the monitor is less than satisfactory, the camera is appropriately adjusted, and the whole recording process repeated. This trial and error process is repeated over and over until the resulting monitor display is satisfactory. In the second camera set-up procedure, the camera is run at a frame rate of 60 per second, its output signals being serially applied directly (i.e. in E-to-E fashion) to the CRT monitor. Such bypassing of the recorder is possible because the camera and monitor, in this second set-up procedure, are both operative at the same 60 per second frame rate, i.e. signal down-conversion is unnecessary. The camera is then adjusted to optimize the display at a frame rate of 60 per second. To optimize (as best can be done) the display at other camera frame rates, camera set-up parameters are then calculated based on the set-up parameters which were set when operating the camera at 60 frames per second.

Both of the above-described camera set-up procedures, aside from being arduous and time consuming, are less than satisfactory from the standpoint of assuredly providing the best monitor display. For example, in the first camera set-up procedure, one would never know whether another iteration of record-and-playback would be productive of an even more improved monitor display; in the second camera set-up, camera parameter calculations are, at best, only coarse calculations.

SUMMARY OF THE INVENTION

In a fast frame recorder having (1) a video camera adapted to produce signals corresponding to a variety of frame rates, (2) a variable speed tape recorder adapted to down-convert the frame rate of the camera signals to a reference frame rate by appropriately reducing the recoder tape speed to a reference speed, and (3) a display monitor adapted to receive the reference frame rate signals, the camera thereof may be adjusted for various scene and frame rate conditions without need to record the camera frame rate signals (for purposes of signal down-conversion). This is, in accordance with the invention, achieved by selecting a certain line (or lines) from each frame of the camera output signal, and applying such selected lines directly to the display monitor. Skipping from line to line in the camera output signal has the effect of down-converting the frame rate of the camera output signal as required. Thus, tape recording for camera set-up purposes is obviated and, attendantly, the camera may be operated at any selected rate while, at the same time, the camera optics, scene lighting, etc., may be adjusted to optimize the monitor display.

The invention, as well as the above referred to fast frame recorder, will now be described with reference to the Figures, of which FIG. 1 is a functional block schematic diagram of a fast frame recorder;

FIGS. 6a, 6b and 6c show the relationship between various operational parameters of the fast frame recorder shown in FIG. 1;

FIG. 7 is an electrical schematic diagram of a divide-by-N circuit in the fast frame recorder shown in FIG. 1;

FIGS. 12–14 are diagrammatic showings useful in describing the workings of the apparatus of FIG. 10.

THE FAST FRAME RECORDER WITHOUT CAMERA SET-UP

As stated above, the fast frame recorder records scene information at a fast frame rate and plays back such information at a slower frame rate, thereby allowing slow motion analysis of a moving object. The camera frame rate used for recording is variable between 60 and 2,000 (actually 1,920) frames per second, depending on the desired speed reduction, while the display frame rate is always at 60 frames per second. Accordingly, the apparent speed at which an object moves when viewed upon playback will be reduced by a factor equal to the ratio of the recording frame rate to the playback frame rate. The maximum speed reduction is, therefore, about 33 (i.e., 2,000 divided by 60). At this speed reduction, the exposure time for each frame is 1/2000th of a second, which is short enough to provide high resolution images (very little image smear) of even rapidly moving objects.

To accomplish such frame rate conversion, the variable tape speed magnetic recorder records and plays back the camera signal with a recording tape speed to playback tape speed ratio that equals the ratio of the camera frame rate to the display frame rate. The magnetic recorder operates in cooperation with a divide-by-N circuit that selectively alters the frequency content of the signal to be recorded; and, in a manner described in detail below, both the value of "N" and the ratio of the recording to playback tape speed are controlled by the selected speed reduction.

Figure 1:
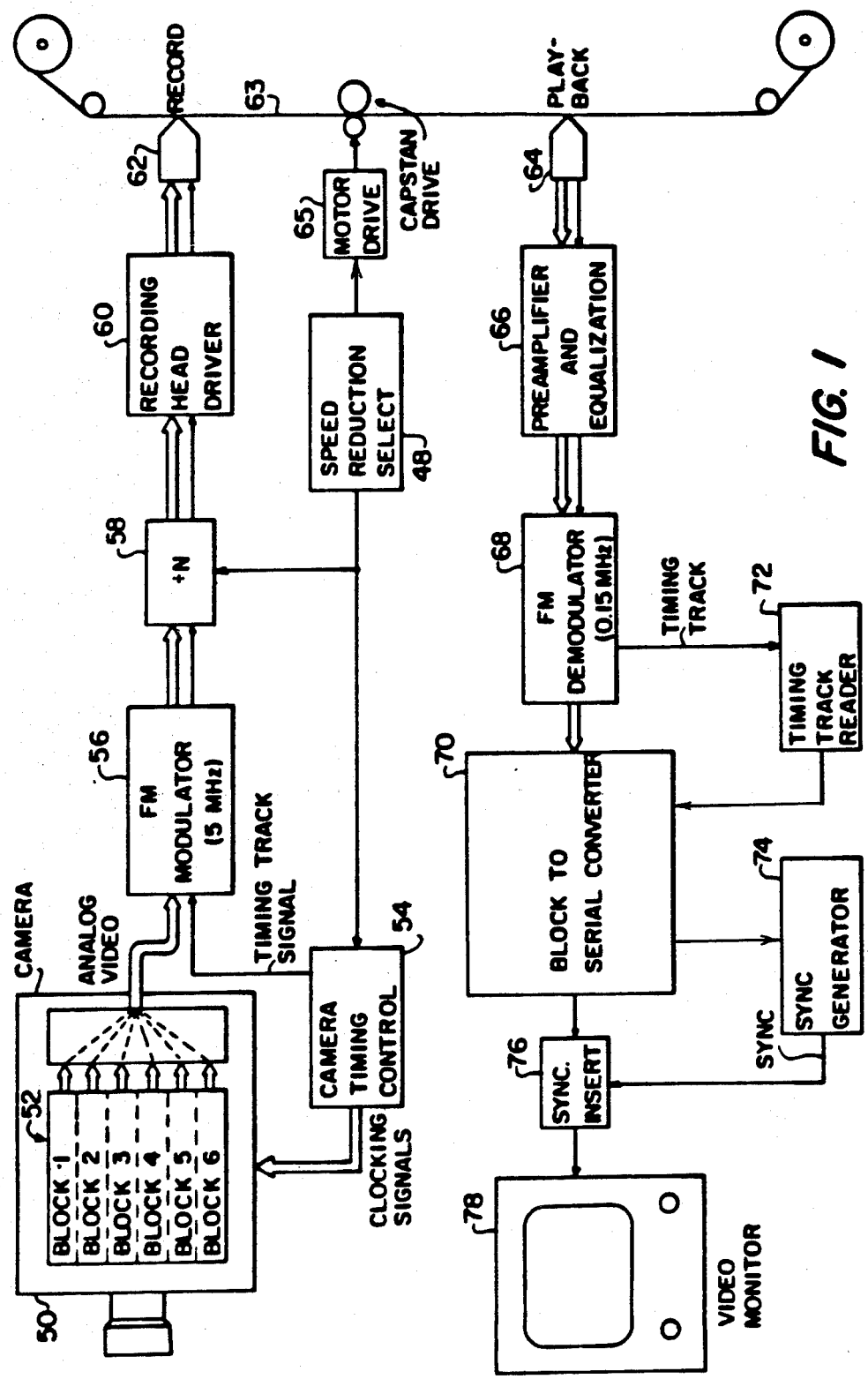

FIG. 1 is a functional block schematic diagram showing the fast frame recorder: Initially, the operator selects the desired speed reduction by means of a speed reduction select circuit 48. Based upon the selected reduction, a camera timing control circuit 54 generates the various clocking signals required to read out a sensor 52 in the camera 50 at a frame rate in accordance with TABLE I:

TABLE I

| SPEED REDUCTION | FRAME RATE (frames per second) |
|---|---|
| 33 | 2,000 (1,920) |
| 17 | 1,000 (960) |
| 8 | 500 (480) |
| 3 | 200 (192) |
| 1 | 60 |

(Numbers appearing in parenthesis are actual frame rates; actual frame rates are used in the discussion below in connection with the discription of the inventive camera set-up feature).

The sensor 52 is a "block" readable area image sensor. The basic concept of block readout of a solid state area image sensor is disclosed in U.S. Pat. No. 4,322,752, filed Jan. 16, 1980 in the name of James A. Bixby, which is hereby incorporated by reference. Specific types of block readable sensors are disclosed in U.S. Pat. No. 4,322,638, filed Jan. 16, 1980 in the names of T. H. Lee and R. P. Khosla, and U.S. Pat. No. 4,330,796, filed Jan. 30, 1980 in the names of C. N. Anagnostopoulos et al, both of which are hereby incorporated by reference.

Figure 2:
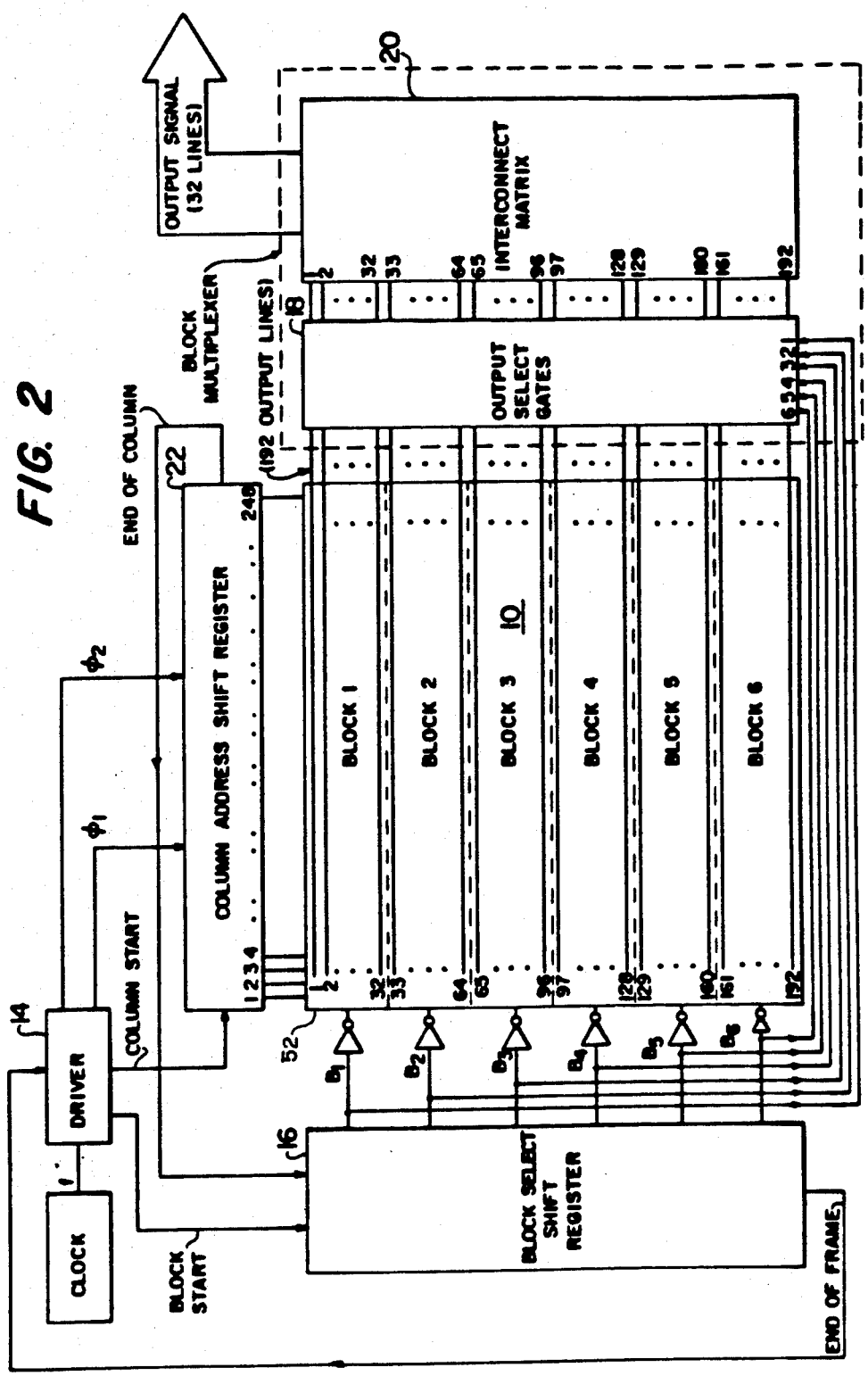
FIG. 2 is a functional block schematic diagram of a block readable area image sensor.
Figure 3:
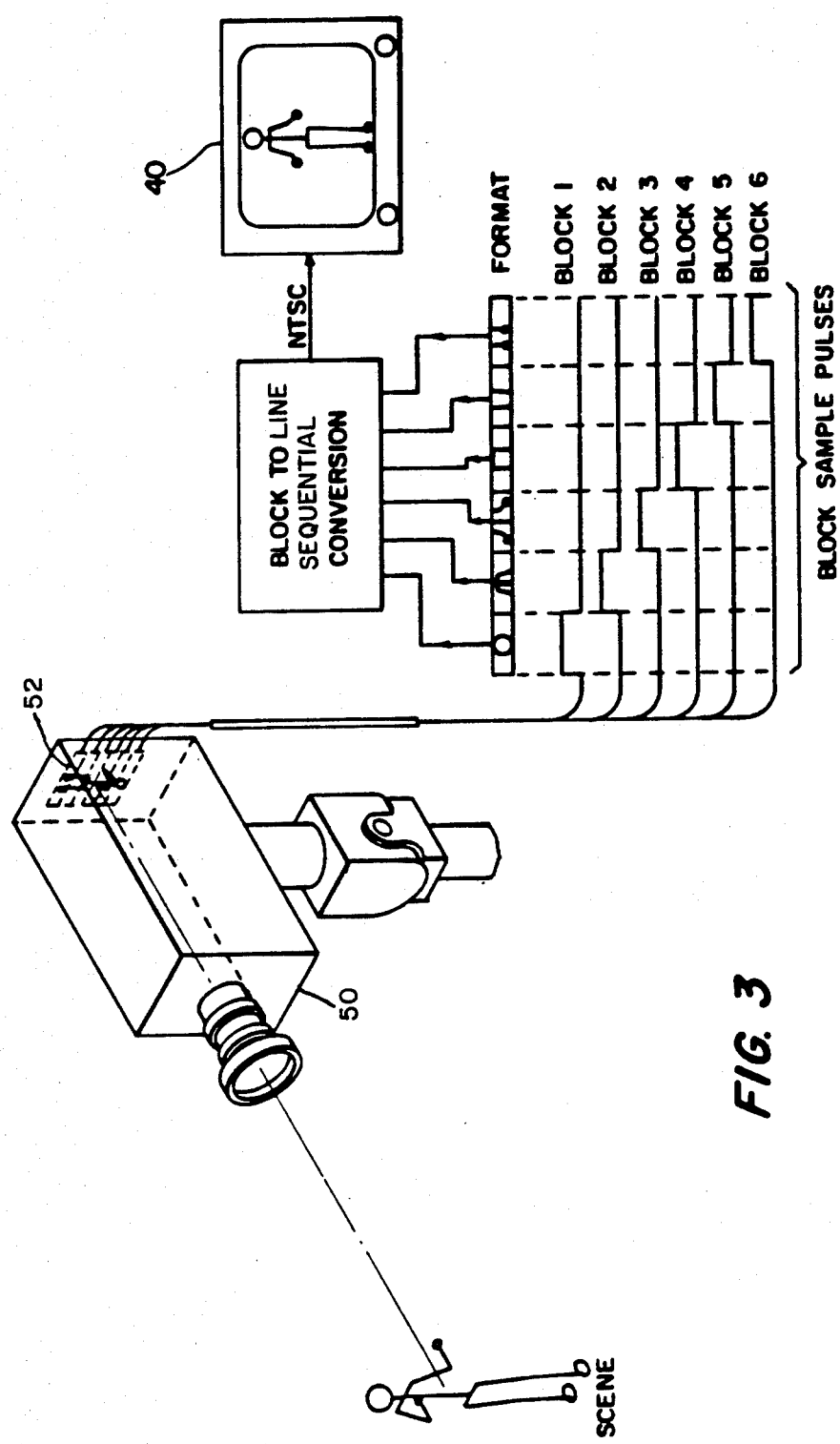
FIG. 3 illustrates, graphically, the concept of video recording using a block readable area image sensor.

Although the referenced patent applications provide detailed information, the basic concept of block readout is illustrated in FIGS. 2 and 3. FIG. 2 shows a block readable sensor 10 that is comprised of an array of photosites (not shown individually) arranged in 192 rows and 240 (plus 16 control pixel positions) columns. For purposes of readout, the sensor 52 is formatted into six blocks of 32 photosite rows each. (There need not be any physical demarcation on the sensor itself between such blocks.) Each photosite is readable upon the application thereto of an enablement signal and an address signal. To begin readout, a driver 14 produces a BLOCK START signal that causes a block select shift register 16 to produce an enablement signal that enables, via block enable line $B_1$, all photosite rows within block 1, i.e., rows 1–32. In response to a COLUMN START signal from the driver 14, column address electronics in the form of a shift register 22 sequentially addresses the 240 photosite columns of the entire area image sensor 52. Because the photosite rows within blocks 2–6 (rows 33–192) are not enabled, only photosite rows 1–32 (block 1) are read out at this time. The remaining photosites in the not-enabled blocks continue to integrate charge in response to incident radiation. After all columns have been addressed, an END OF COLUMN signal sequences the block select shift register 16 to enable, via block enable line $B_2$, the block 2 photosite rows, i.e., rows 33–64. Column-wise readout then proceeds as described above for the block 1 photosite rows. This process is repeated until all 6 blocks of photosite rows are read out, at which time an END OF FRAME signal from the block select shift register 16 resets the driver 14 for readout of the next frame.

Output select gates 18 and an interconnect matrix 20 of conductive bus lines perform the function of a block multiplexer that causes only signals from the 32 photosite rows within the block that is being read out to appear as an output signal. Reference may be had to U.S. Pat. No. 4,322,638 for a more detailed discussion of the output select gates 18 and the interconnect matrix 20.

As a result of such readout, block information is produced in series; and each block of information contains 32 row signals arranged in parallel. A result of such a readout technique is the reduction of the time required for sensor readout by a factor of 32 (i.e., the number of photosite rows in a block). Attendantly, a sensor that can be read out at a maximum frame rate of, say, 60 frames per second using conventional serial line readout can be read out at a rate of 1920 frames per second when operation is as described above.

FIG. 3 illustrates, graphically, how frame information, formatted in blocks as described above, may be recombined to form a video display. The camera 50 images a scene onto the photosensitive surface of the block readable area image sensor 52. By reading out the sensor in blocks, the scene is "sampled", in effect, by "block sample pulses". The frame information (labelled FORMAT) corresponding to each block is shown in "pictorial form" above its respective block sample pulse. The block format frame information is converted to a suitable line sequential signal and applied to a video monitor 40. The scene can then be displayed on the video monitor 40.

Figure 4:
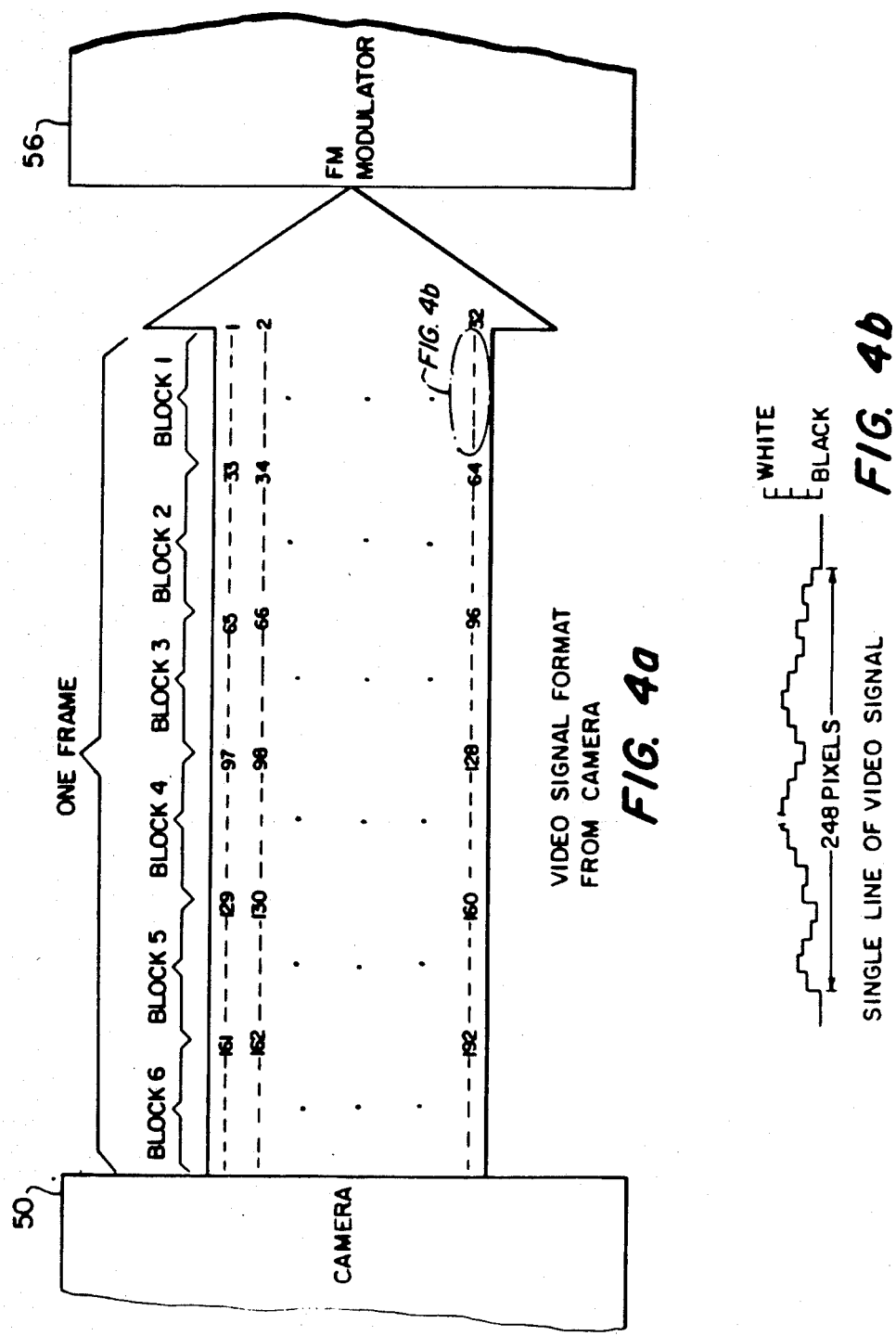
FIGS. 4a and 4b depict the format and content of a video signal produced by block readout of an area image sensor.

As shown in FIG. 4a, the video signal resulting from block readout of a single frame is comprised of a serial train of block information wherein each block is comprised of 32 lines of video information that correspond to the 32 rows of photosites within each block. Each individual line of video information (see FIG. 4b) is an analog signal varying in level proportionate to the level of scene illuminance; and, each line contains 240 picture elements (pixels) that correspond, respectively, to the 240 photosites in each row of photosites.

Referring again to FIG. 1, each of the 32 line signals that constitutes the analog video signal from the camera is frequency modulated, in an FM modulator circuit 56, on a carrier having a center frequency of 5 MHz. It will be assumed, for purposes of illustration, that the frequency deviation is ±1.6 MHz. A timing track signal containing sync information is also frequency modulated on a 5 MHz carrier. The output of the FM modulator circuit 56 is, therefore, comprised of 33 separate, frequency modulated signals, i.e., 32 video signals and a timing track signal.

All 33 frequency modulated signals undergo a divide-by-N process in a divide-by-N circuit 58, described in detail with reference to FIG. 7. The value of "N" is equal (to the nearest integer) to the maximum selectable speed reduction divided by the selected speed reduction. The relationship between "N" and various values of the speed reduction is given in TABLE II:

TABLE II

| SPEED REDUCTION | N |
| --- | --- |
| 33 | 1 |
| 17 | 2 |
| 8 | 4 |
| 3 | 10 |
| 1 | 33 |

It will be noted that the selected speed reduction has been used to determine both the frame rate at which the sensor 52 is read out (see Table I) and the value of "N" in the divide-by-N circuit 58 (see Table II). While it may not be apparent how these two parameters (frame rate and "N") relate to slow motion replay, the discussion which follows will show that the selection of these two parameters as described above, in conjunction with the proper selection of a third parameter (recording tape speed), will produce the desired speed reduction of scene information upon playback.

Figure 5:
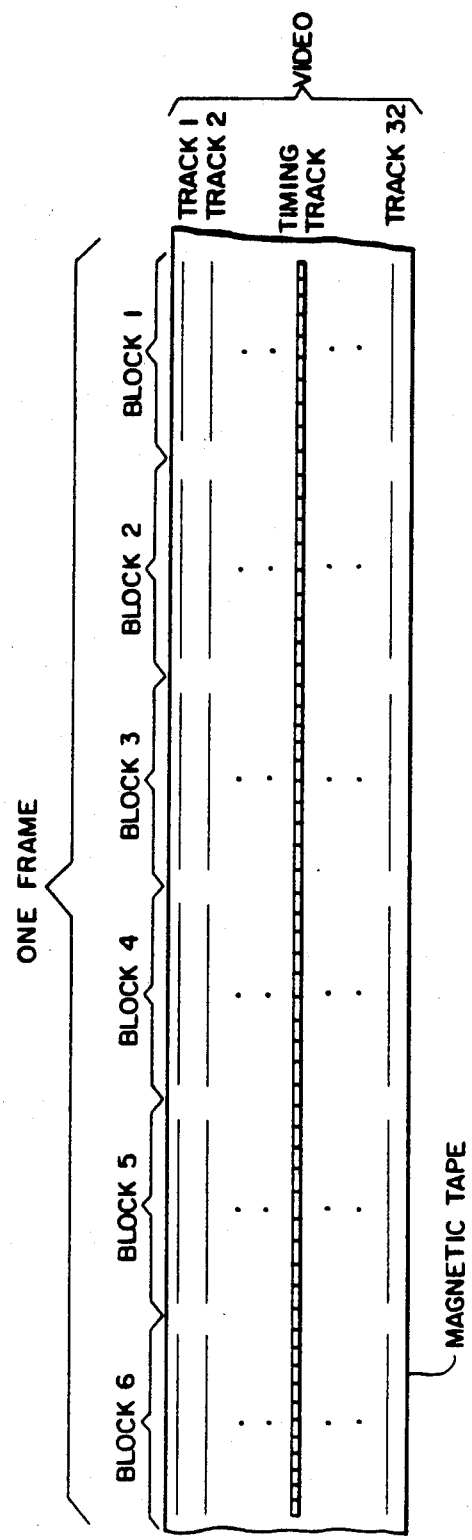
FIG. 5 shows the format of information as recorded on magnetic tape in the fast frame recorder shown in FIG. 1.

The output of the divide-by-N circuit 58 is comprised of 33 frequency divided, frequency modulated signals. These signals are applied to a recording head driver circuit 60 that drives a multi-channel longitudinal recorder that includes a 33 channel magnetic recording head 62. The 33 signals are recorded along 33 separate tracks on a magnetic tape 63. Upon recording, the signals retain the block format, as shown in FIG. 5.

Figure 8:
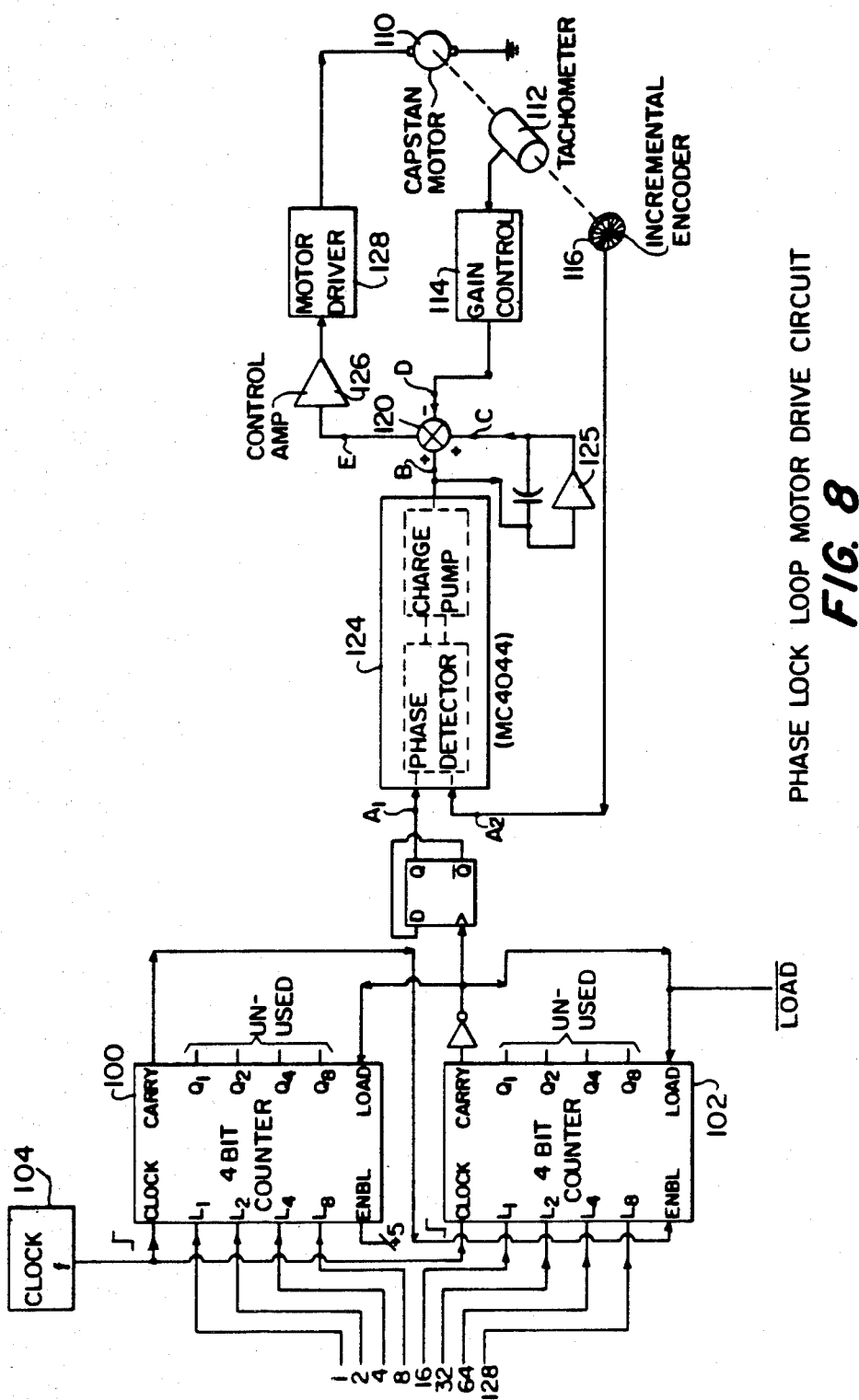
FIG. 8 is a block diagram of a motor drive circuit used in the fast frame recorder shown in FIG. 1.

The magnetic tape 63 is advanced by a capstan drive that is controlled by a motor drive circuit 65, described in detail with reference to FIG. 8. The speed at which the magnetic tape 63 is advanced during recording is selected to be proportional to the selected speed reduction. The recording tape speeds for the selectable speed reductions is given in TABLE III:

TABLE III

| SPEED REDUCTION | RECORDING TAPE SPEED (inches per second) |
| --- | --- |
| 33 | 200 |
| 17 | 100 |
| 8 | 50 |
| 3 | 20 |
| 1 | 6 |

Having tape recorded information that corresponds to the moving object (scene information) under study, a slow motion video display of such object is produced by playing back the recorded information at a constant tape speed of, say, 6 inches per second, irrespective of the originally selected speed reduction. As a result, the ratio of the recording tape speed to the playback tape speed yields a tape speed reduction ratio that equals the selected speed reduction. Further, all reproduced signals have the same center frequency ($f_c$) and frequency deviation ($\Delta f$), thereby enabling a fixed frequency demodulator to be used irrespective of the selected speed reduction. To understand why the above-described selection of recording frame rate, the factor "N", recording tape speed and playback tape speed results in the desired speed reduction and signal form upon playback, reference is made to FIGS. 6a through 6c. For convenience, the various speed reductions and the parameters whose values are determined thereby are summarized in FIG. 6a. It is apparent from inspection of FIG. 6a that "N" is equal to the maximum selected camera frame rate divided by the selected camera frame rate (which is determined by the speed reduction, as discussed above). The effect of the divide-by-N circuit 58 is to reduce the center frequency and the frequency deviation by a factor of "N", as summarized in FIG. 6b. But because the ratio of record tape speed to playback tape speed varies in inverse proportion to "N", all signals produced upon playback have the same center frequency ($f_c = 0.15$ MHz) and frequency deviation ($\Delta f = 0.05$ MHz); see FIG. 6c. Further, because the playback tape speed is always 6 inches per second, all video information is reproduced at a frame rate of 60 frames per second, thereby resulting in the desired speed reduction.

As a specific example, assume that a speed reduction of 8 is selected. (For this example, reference is made to FIGS. 1 and 6a through 6c.) Selecting a speed reduction of 8 will cause the camera sensor 52 to be read out at a frame rate of 500 frames per second (FIG. 6a). The FM modulator 56 frequency modulates the video signal onto a 5 MHz carrier to produce a frequency modulated video signal having a center frequency equal to 5 MHz and a frequency deviation equal to 1.6 MHz. The divide-by-N circuit 58, with N=4, reduces the frequency content of the video signal information by a factor of 4, thereby resulting in a frequency modulated signal having a center frequency equal to 1.25 MHz and a frequency deviation of 0.4 MHz (FIG. 6b). This signal is recorded at a tape speed of 50 inches per second. Playing back this signal at a tape speed of 6 inches per second results in a recovered signal that has a center frequency equal to 0.15 MHz, a frequency deviation equal to 0.05 MHz, and a frame rate of 60 frames per second (FIG. 6c). The desired speed reduction of 8 (more precisely, 8.25) has thus been achieved.

Referring again to FIG. 1, the signal produced by the playback head 64 undergoes signal processing in a preamplifier and equalization circuit 66. The processed signal is then demodulated in an FM demodulator circuit 68. As a result of selecting the various operating parameters as described above, all reproduced signals have the same center frequency and frequency deviation.

Figure 9:
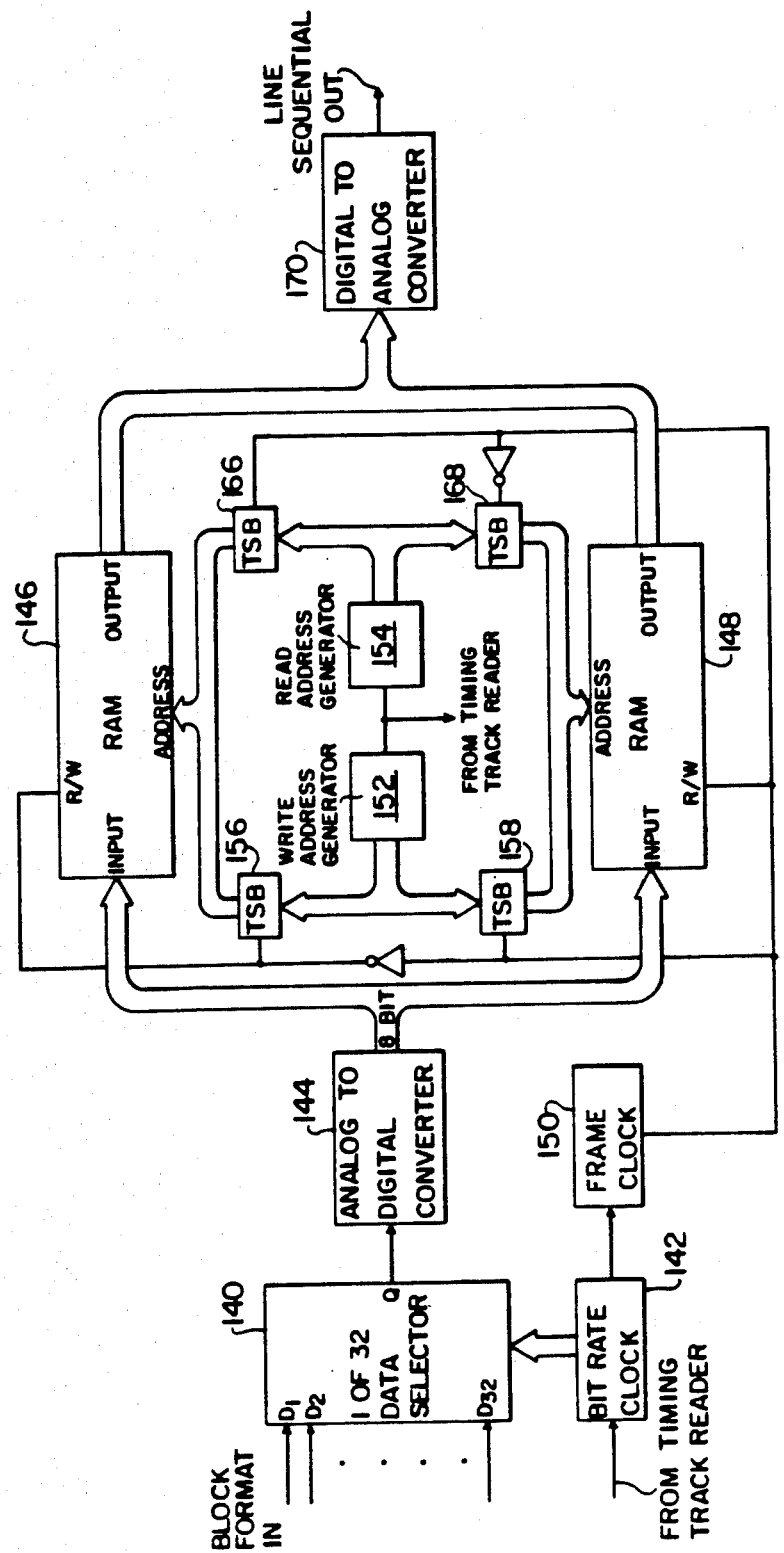
FIG. 9 is a functional block schematic diagram of a format conversion circuit used in the fast frame recorder shown in FIG. 1.

After demodulation, the video signal, which is still in the block format shown in FIG. 4a, is converted to a line sequential video signal by a block to serial converter circuit 70 (described in detail in connection with FIG. 9). The demodulated timing track signal, on the other hand, is diverted to a timing track reader circuit 72 that extracts the sync information. the extracted sync information is used to control a sync generator circuit 74 that produces a standard sync signal at its output. A sync insert circuit 76 inserts the sync signal into the line sequential video signal from the format converter 70 to produce a video signal for display on the video monitor 78. The displayed scene information will, as described above, consist of a slow motion replay of the originally recorded scene at the selected speed reduction.

The divide-by-N circuit 58 discussed in connection with FIG. 1 is shown in more detail in FIG. 7. FIG. 7 shows the circuit for only a single video channel since all 33 signals (32 video signals and one timing track signal) are treated identically. Further, while in the above description it has been assumed for purposes of illustration that the speed reduction will be selected from one of five values (33, 17, 8, 3 and 1), the circuit shown in FIG. 7 is designed to handle up to 256 separate speed reductions. The selected speed reduction is applied to a programmable read-only-memory (PROM) 88 which produces on its output lines the 8-bit binary equivalent of 256 minus "N". The four least significant bits are applied to the load inputs ($L_1$, $L_2$, $L_4$ and $L_8$) of a 4-bit binary counter 92. The four most significant bits are applied to the load inputs ($L_1$, $L_2$, $L_4$ and $L_8$) of a 4-bit binary counter 94. The speed reduction select circuit 48, after a time sufficient to allow the data to settle on the load inputs, produces a LOAD signal that causes each of the counters 92 and 94 to be loaded with the count appearing on their respective load inputs. For example, if a speed reduction of 33 was selected ("N" equals 1, see FIG. 6a), the output of the PROM 88 would be the binary equivalent of 256−1, which is 11111111. The binary counter 92 would thus be loaded with 15 (binary 1111), as would the binary counter 94.

The frequency modulated video signal, after conversion to digital form in a frequency to pulse width modulator 90, clocks the binary counters 92 and 94. Initially, the counter 94 is disabled because of the low state of the carry of counter 92. The digital video signal applied to the clock input of the counter 92, however, causes the counter 92 to start counting from its present value (as preset by the PROM 88) up to 15, at which time the carry goes high thereby enabling the counter 94. On the next positive edge transition of the digital video signal, the counter 94 increments one count from its present count (as presented by the PROM 88), and the carry output of the counter 92 returns to its low state, thereby disabling the counter 94. This process repeats until the counter 94 increments from its preset value to 15, at which time its carry output goes high on the next clock pulse, and the counters are reloaded to the preset count (256−N) appearing on the load inputs. The carry output of the counter 94 toggles a flip flop 97 between high and low states once each Nth cycle of the original digital video signal. After conversion back to a frequency modulated signal in a pulse width to frequency converter 98, an FM video signal results which has been reduced in frequency by factor of "N" relative to the original input video signal. The divide-by-N circuit shown in FIG. 7, therefore, frequency reduces an input video signal by a factor of "N", wherein N can be any integer value between 1 and 256.

Selection of the speed reduction, as described above, also controls the tape speed at which information is recorded. FIG. 8 shows the motor drive circuit 65 in detail. An 8-bit binary number representing 256 minus "N" (which may be obtained, for example, from the PROM 88 shown in FIG. 7) is applied to a pair of 4-bit counters 100 and 102. Operation of the counters 100 and 102 is identical to that described in connection with the counters 92 and 94 of FIG. 7. The only difference is that each of the counters 100 and 102 is driven by a high frequency clock 104, instead of a digital video signal. The output signal appearing at point $A_1$, therefore, consists of a pulse train having a frequency which is less than the clock frequency by a factor of "N". This pulse train is used to control the speed of a capstan motor 110. Connected to the shaft of the capstan motor 110 is a tachometer 112 that produces a signal which varies in amplitude proportionately with motor speed. The signal from the tachometer 112 passes through a gain control circuit 114 and to an inverting input of a summing circuit 120. Also connected to the shaft of the capstan motor 110 is an incremental encoder 116 that produces a pulse train having a repetition rate which varies in proportion to motor speed. A phase-frequency detector 124 (such as an MC4044) compares the phases of the signals appearing at points $A_1$ and $A_2$ and produces an output signal at point B which is applied to the summing circuit 120. The output signal from the phase-frequency detector 124 is integrated by an integrator 125, the output of which is also applied to the summing circuit 120. The output of the summing circuit 120 is amplified by an amplifier 126 and is used to control a motor driver 128.

As discussed above, the signal reproduced upon playback is formatted, as shown in FIG. 4a, in blocks, wherein each block contains 32 video line signals. Because conventional video monitors are not compatible with such a block format signal, a block to serial conversion circuit 70 (FIG. 1) is used to convert the block format signal to a line sequential signal that is compatible with a standard video monitor. The block to serial conversion circuit 70 is shown in FIG. 9. (Note: Understanding the operation of the workings of the apparatus of FIG. 9—which also appears as FIG. 12 of U.S. Pat. No. 4,339,775—is important to a good appreciation of the invention.) The block format signal is applied to the input data lines $D_1$ through $D_{32}$ of a 1 of 32 data selector 140 that is capable of being randomly addressed. Operation of the data selector 140 is controlled, in part, by a bit rate clock 142 that increments its count 32 times as fast as the pixel rate. Assume initially, therefore, that the pixel information corresponding to column 1 of lines 1 through 32 appears on the input data lines $D_1$ through $D_{32}$, respectively. The data selector 140 sequentially routes the signal appearing on each input data line ($D_1$ through $D_{32}$) to the output data line Q at a rate which is 32 times faster than the pixel rate of video information. The data selector 140 thus samples all 32 input data lines before the pixel information corresponding to column 2 of lines 1 through 32 appears on the input data lines.

The output signal from the data selector 140 is comprised of a series of analog information bits each of which corresponds to a different pixel of video information. In terms of the corresponding video information, the order of such information bits is as follows: column 1 of lines 1 through 32, column 2 of lines 1 through 32, and so on, to column 240 of lines 1 through 32. The analog information bits are converted to their 8-bit binary equivalent by an analog to digital converter 144. The resulting stream of binary data is applied to the input data busses of a pair of RAMs (Random Access Memories) 146 and 148, each of which is capable of storing the binary data corresponding to one frame of video signal.

A write address generator 152 generates the address used to write data into the RAMs 146 and 148. Basically, the write address generator 152 is a counter which increments one count for each increment of the bit rate clock 142. The write address generator 152 counts sequentially so that input data is stored in sequential storage locations. A pair of tri-state buffers 156 and 158 determine which of the RAMs 146 and 148 receives the write address.

In a similar manner, a read address generator 154 generates a read address used to read data from the RAMs 146 and 148. Again, a pair of tri-state buffers 166 and 168 determine which of the RAMs 146 and 148 receives the read address. There is an important difference between the write address generator 152 and the read address generator 154: While the write address generator 152 counts sequentially, the read address generator 154 counts in such a manner that the signal read from each RAM is in a line-sequential format. This result is accomplished by designing the read address generator 154 so that it repeatedly counts by 32's. By so counting, block one data, for example, is read out in the following order: line 1, columns 1 through 240; line 2, columns 1 through 240; and so on, to line 32, columns 1 through 240. This is precisely the order of data that corresponds to a line sequential signal.

Operation of the tri-state buffers 156, 158, 166 and 168 is controlled by a frame clock 150 that causes a frame of information to be written into the RAM 146 while a frame of information is read from the RAM 148. The next frame of information is then written into the RAM 148 while the previously written frame is read from the RAM 146. As information is read from either of the RAMs 146 or 148, it is converted back to analog form by a digital to analog converter 170 to produce an analog line sequential output signal. This signal, after insertion of sync information, is suitable for video display.

THE FAST FRAME RECORDER WITH CAMERA SET-UP MODE (OVERVIEW)

Figure 10:
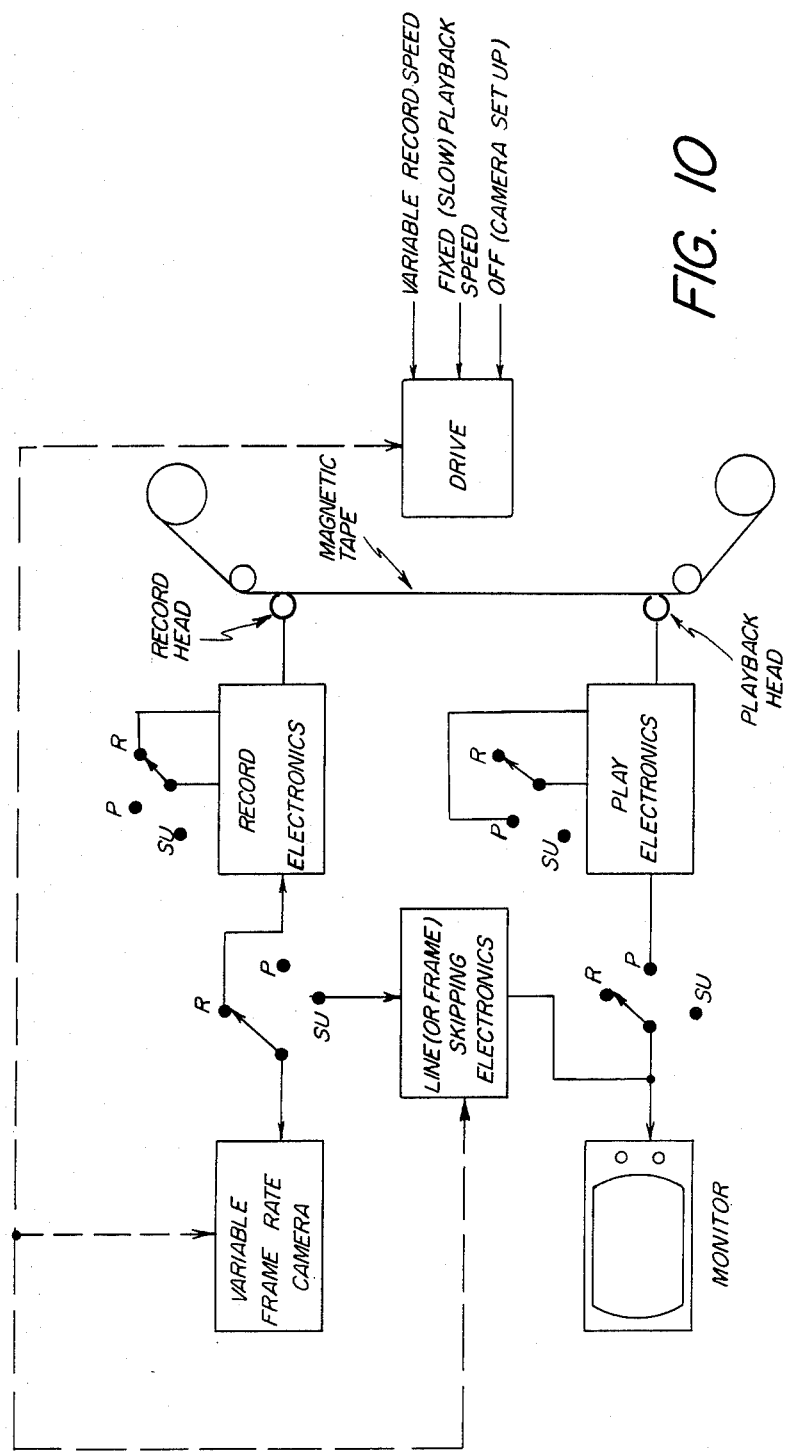
FIG. 10 is a schematic block diagram illustrating an overview of apparatus according to the invention.

The camera set-up feature of the present invention is embodied in the prior art apparatus of FIG. 1 by means of particularized switching and programmable logic. In all other respects the apparatus of the invention is exactly the same as has heretofore been disclosed. Before addressing the details of the invention, however, it is considered worthwhile first to provide an overview of the inventive concept. Referring, therefore, to FIG. 10, fast frame recorder apparatus is simplistically shown adaptable to three modes of operation: the record mode R, at variable frame rates; the playback mode P, at a fixed (generally slower) frame rate; and the camera set-up mode S.U. With the FIG. 10 apparatus in the record mode R, signals at the selected frame rate are processed through the record electronics to a record head for recording a magnetic tape run at a suitable speed. This operation is exactly as described above. With the FIG. 10 apparatus in the playback mode P, the magnetic tape is, as also described above, run at a given slower speed, signals derived from the tape being picked up by a playback head and applied via playback electronics to a display monitor for slow motion replay. As to the recording and playback aspects of the apparatus of FIG. 10, there is essentially no change over that which was described in connection with FIGS. 1–9.

Now, recognizing that the camera frame rate can be many times greater than the frame rate at which the monitor operates, i.e. the monitor receives playback signals and operates at a frame rate of 60 frames per second, the question is "How can the monitor perceive an input at 60 frames per second when the camera output, during the set-up operation (S.U.), is at a different (higher) rate?". Since the scene viewed by the camera during set-up is generally a static one, the invention simulates the standard 60 frame per second playback rate by using only some—and discarding other—of the information derived from the variable frame rate camera. For example, with the camera set up to produce signals at a frame rate of, say, 1,920 per second, the application of every 32nd line of every frame to the monitor will have the effect of dividing the camera frame rate of 1,920 per second down to a frame rate of 60 per second, i.e., 1920/32=60. Thus, by directly applying the monitor line 1 of block 1 . . . line 2 of block 2 . . . line 3 of block 3 and so on down to line 32 of block 32, and then repeating the process over and over, the monitor will see a series of 192 line frames at the rate of 60 per second. Attendantly, the display of the monitor will be a coherent discernible one which will allow the camera focus, exposure, depth of field, scene lighting, etc., to be adjusted while simultaneously viewing the monitor display for purposes of optimizing such display. In a similar way, with the variable frame rate camera set to the rates of 960, 480, 192 and 60 frames per second, a 60 frame per second monitor input can be effected by utilizing, respectively, 2, 4, 8 and 32 lines per block while discarding all other lines. For example, with the camera set to 960 frames per second, lines 1, 2 from block 1 . . . lines 3, 4 from block 2 . . . lines 5,6 from block 3 and so on to lines 31, 32 from block 16 can be used to compose the first 32 lines of frame 1 of a 60 frame per second input to the monitor. Then the whole process is repeated for lines 33-64 of monitor input frame 1, and so on. Regarding a camera frame rate of 480 per second, such is converted to a 60 per second monitor input frame rate by utilizing, say, lines 1-4 from block 1 . . . lines 5-8 from block 2 . . . and so on to lines 28-32 from block 8. Then, again, the whole process is repeated, and so on. At a camera frame rate of 192, the selective order is for lines 1-8 from block 1 . . . lines 9-17 from block 2, etc. At a camera frame rate of 60 per second, no line skipping, as would be expected, is practiced.

Figure 11:
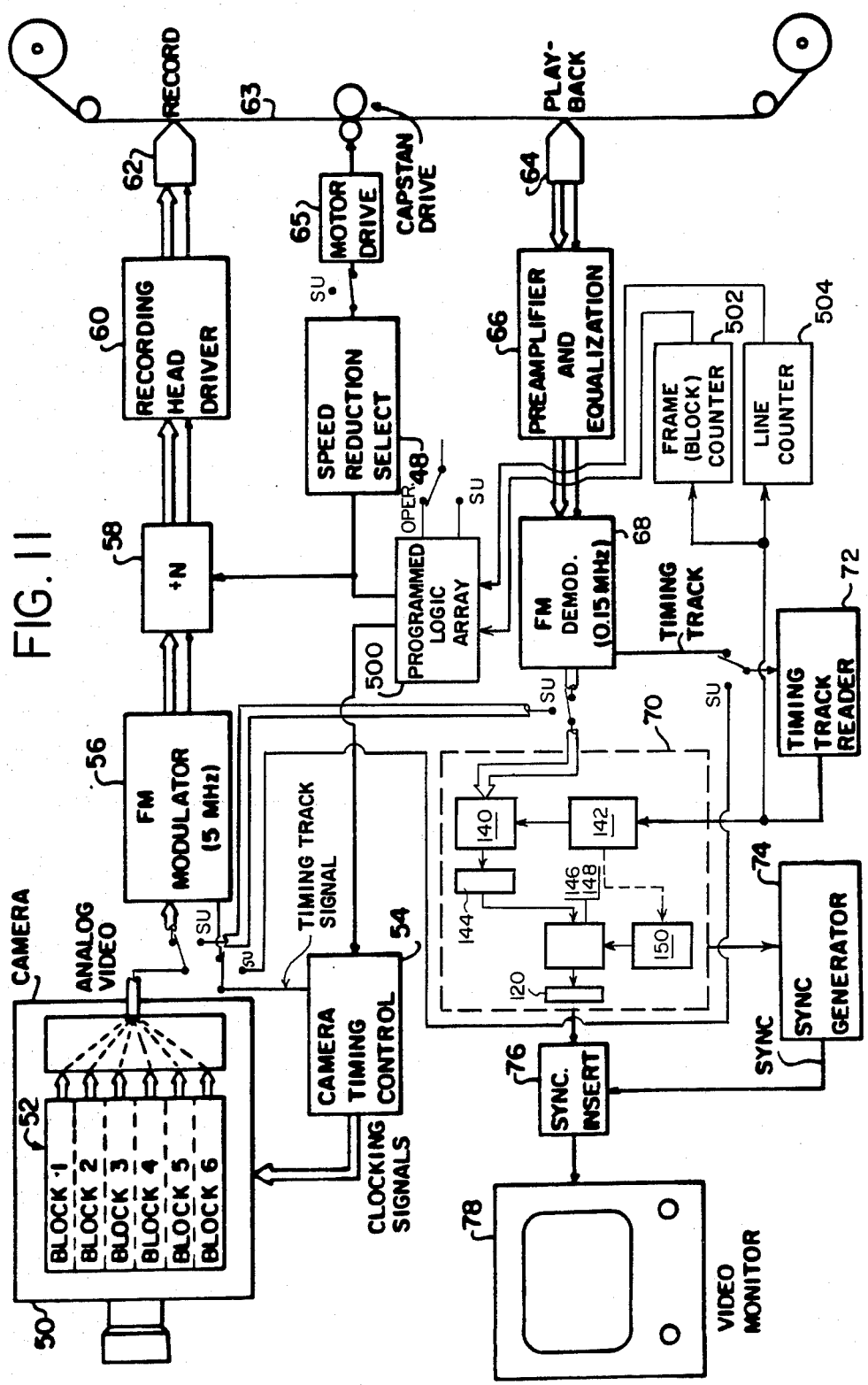
FIG. 11 is a block diagram of the fast frame recorder of FIG. 1 modified to include the camera set-up feature of the invention.

Bearing in mind the above overview of the invention, reference should now be had to FIG. 11. For convenience, FIG. 11 has been provided in the same form as that of FIG. 1 . . . modified however to include components for praticing the invention. As depicted, the apparatus of FIG. 11 has been "switched" to operate, not in the camera set-up mode, but in the record/playback mode(s). Therefore, when for example the FIG. 11 apparatus is in the throes of slow motion replay, the demodulator 68 applies 32 tracks of video signal information column-by-column to the data selector 140. The data selector 140 then, in response to addressing by a programmed logic array 500 (e.g. a Signetics 82S100), effects line-by-line scanning of the columns of applied video. Thereafter the columns of video information are buffered (146, 148) in frame-by-frame fashion to convert the video information in parallel to line sequential form as described above.

Consider now that the various switches depicted in FIG. 11 have been thrown, thereby to ready the camera for its set-up procedure; and imagine that the camera 50 is set up for, say, a frame rate of 1,920 per second: The speed reduction select 48, via the programmed logic array 500, causes the camera timing control to generate the 1,920 frame per second clock as if recording were to be made on tape 63. Camera output signals, at a frame rate of 1,920 per second, are then short-circuited from the camera 50 directly to the data selector 140. Since the data selector 140—during normal playback from tape—ordinarily receives video data at a 60 frame per second rate, the programmed logic array works to down-convert the high frame rate of the camera to a frame rate of 60 per second. How this is done may be appreciated from a review of FIG. 12, wherein "B", "C", and "L" respectively stand for "block", "column", and "line":

As column 1 of block 1 of the camera output appears at the input of the data selector 140, the programmed logic array 500 effects sampling of the line 1 pixel (B1, C1, L1) . . . the pixels 2 through 32 of column 1 being discarded. As column 2 of block 1 appears at the input of the data selector 140, the programmed logic array again effects sampling of the line 1 pixel (B1, C2, L1) . . . and again pixels 2 through 32 (of column 2) are discarded. This process is repeated for all 240 columns of block 1, with the result being that line 1 of the video information applied via the analog to digital converter 144 to the buffer 146, 148 is exclusively derived from block 1 of the camera output. When block 2 of the camera output video appears at the input to the data selector 140, the above process is repeated, only this time the programmed logic array effects exclusive sampling of the line 2 pixels. Thus, line 2 of the video applied to the buffer is derived exclusively from block 2. Thereafter, lines 3 through 192 of the video applied to the buffer are derived line-by-line from the next 190 blocks of video produced by the camera 50 . . . the 192 lines in question constituting the first frame applied to the monitor. In like manner, frame 2 of the video applied to the monitor is derived line-by-line from blocks 193 through 384 . . . frame and line counters 502, 504 keeping track of the line selection effected by means of the programmed logic array.

Video processing as just described has the effect of down-converting the 1,920 per second frame rate of the camera 50 by a factor of 32 to a frame rate of 60 per second. Attendantly, the monitor will provide a coherent display which will allow the camera, scene lighting, etc., to be adjusted while simultaneously viewing the monitor . . . and this despite the fact that the camera and monitor are operating at significantly different frame rates.

In a similar way, with the camera set to operate at a frame rate of 960 per second during camera set-up, two lines per block are utilized to down-convert the 960 frames per second to 60 frames per second, i.e. 960/16=60. This is implemented (FIG. 13) as follows:

As lines 1-32 of column 1 (block 1) of the camera 960 frame per second signal gets applied to the data selector 140, the programmed logic array effects sampling of the column 1, line 1 pixel . . . and then sampling of the column 1, line 2 pixel. Pixels associated with column 1, lines 3-32 of block 1 are not sampled, and are discarded. As column 2 of the 32 line video signal appears at the input to the data selector, the line 1 and 2 pixels are again sampled, with the pixels associated with column 2, lines 3-32 being again discarded. Thus, in a manner directly analogous to that described above re camera set-up at 1,920 frames per second, the monitor 60 frame per second input is little-by-little created.

Figure 14:
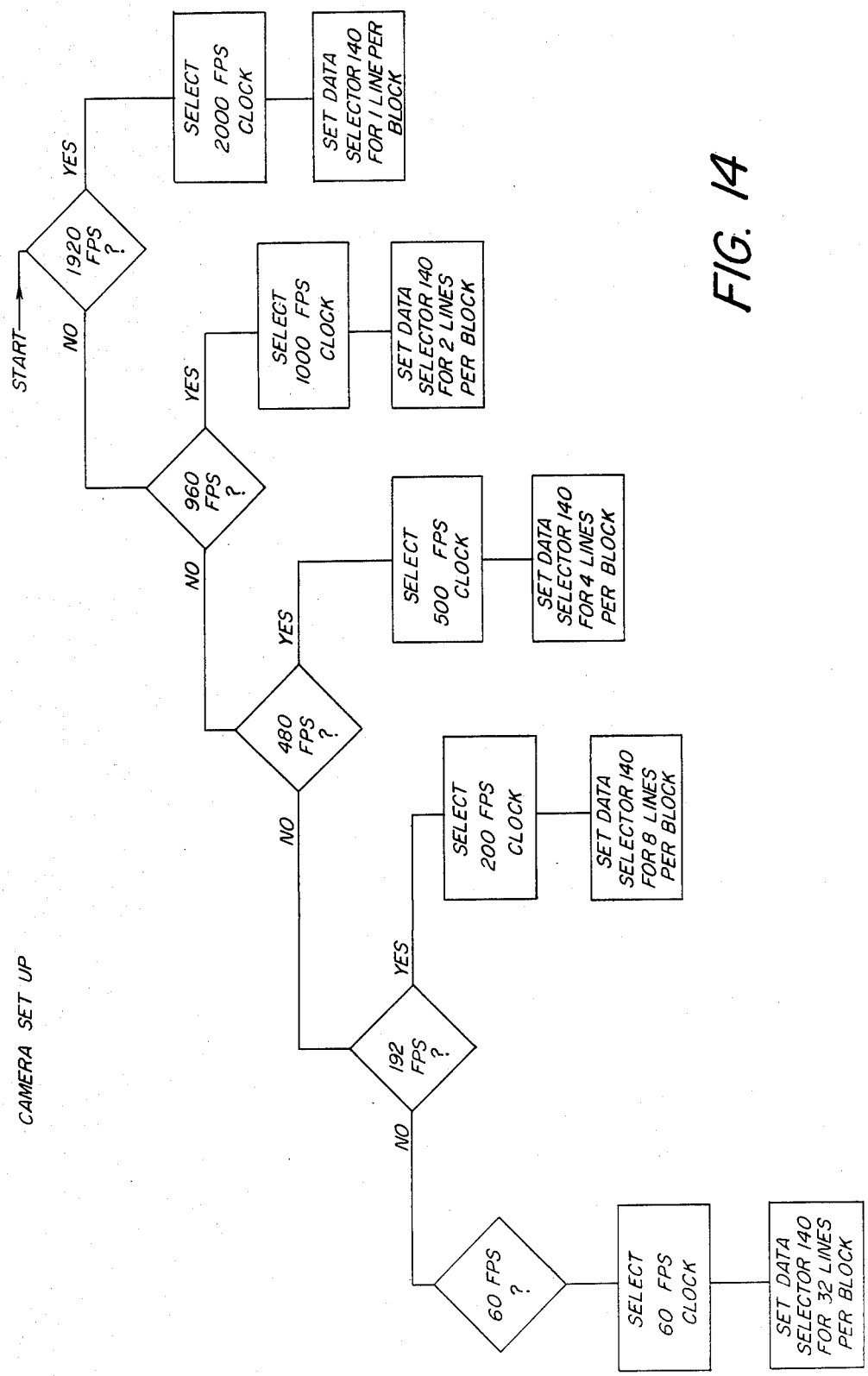

While addressing the data selector 140 is, as presently preferred, by means of a 82S100 programmed logic array, other programmable devices may be utilized as well. Whatever the form such a device may take, however, a program similar to that reflected in the flow chart of FIG. 14 will be implemented. Note that for camera set-up 480 and 192 frames per second, 4 and 8 lines per block are processed to the monitor. This, again, is directly analogous to the processing effected for camera set-up at 1,920 and 960 frames per second as described above.

The invention has been described in detail with particular reference to preferred embodiments thereof, but it will be understood that variations and modifications can be effected within the spirit and scope of the invention. For example, rather than process video lines in the consecutive orders noted above, other orders may be implemented as well, e.g. re the frame rate of 1,920, lines 1, 3, 5, etc. could be derived respectively from blocks 1-3 etc. Also, whereas down-converting via the programmed logic array is effected by a line skipping procedure, it is within the scope of the invention to provide such down-conversion by skipping frames, e.g. in the case of a 1,920 frame rate camera set-up, every 32nd frame could be used to convert the 1,920 frame per second rate to a rate of 60 frames per second.

What is claimed is:

1. In fast frame recorder apparatus having a video camera operative at a first relatively high frame rate, a video monitor operative at a second lesser frame rate, a recorder for recording the relatively high frame rate camera signal on a recording medium operative at a given recording speed, and for playing back said recorded signal at a lesser speed to down-convert the relatively high frame rate of said camera signal to said second frame rate, and means for applying the down-converted frame rate signal to said monitor for displaying the scene associated with said camera signal on said monitor, the improvement of ancillary means for down-converting the frame rate of said camera signal to said second frame rate, and for selectively applying the down-converted frame rate signal of said ancillary means to said monitor, thereby allowing the camera of said fast frame recorder apparatus to be adjusted, while viewing said monitor, without need to record and play back said camera signal at differing speeds, said ancillary means for down-converting the frame rate of said camera signal comprising means for receiving the camera output signal and for selectively applying predetermined portions of such signal to said monitor, said means for applying predetermined portions of the camera signal to said monitor being means for applying signals corresponding to one or more lines from each camera frame to said monitor, said fast frame recorder apparatus further comprising means for selectively applying to said monitor signals corresponding to a different line or lines from each frame of successive groupings of frames.

2. The improved apparatus of claim 1 wherein the lines corresponding to said selectively applied signals are the same from one frame grouping to the next.

3. The apparatus of claim 1 wherein said camera is operative at a number of frame rates, wherein said recorder is operative at a corresponding number of recording speeds and at a given playback speed, and wherein said means for selectively applying to said monitor signals corresponding to one or more lines from each camera frame includes means for varying, inversely with respect to the frame rate of said camera, the number of line signals from any given camera frame that are applied to said monitor.

4. In cooperation with fast frame recorder apparatus comprised of a video camera operable at a first frame rate, means adapted to receive and record the camera output signal at a given record speed, means adapted to play back said recorded signal at a given playback speed less than said record speed, thereby to provide a playback signal having a second frame rate less than said first frame rate, and a video display monitor operable at said second frame rate adapted to receive said playback signal for displaying the scene viewed by said camera, apparatus for independently converting the camera signal to a signal having said second frame rate without need to record and play back said camera signal, whereby the scene viewed by said camera can be displayed by said monitor in real time, thereby to permit said camera to be adjusted to optimize the display of said monitor while simultaneously operating both said camera and said monitor, said apparatus comprising means for receiving said camera signal and for selectively applying to said monitor signals representing a different line or lines from successive groupings of frames of the camera signal, each said grouping consisting of the same number of frames, the number of selectively applied lines per camera frame times the number f frames in each grouping thereof constituting the number of video lines per frame of the display of said monitor.

5. The apparatus of claim 4 wherein
(a) said camera output signal consists of a plurality of parallel video line signals,
(b) said means adapted to play back said recorded signal includes a parallel-to-serial converter for converting the plurality of parallel line signals to a line sequential format for application thereof to said monitor, and
(c) said means for independently converting said camera signal to a signal having said second frame rate includes means for selectively processing particular video line signals through said parallel-to-serial converter.

6. The apparatus of claim 4
(a) wherein said camera is selectively operable at any one of a number of frame rates,
(b) wherein said recorder is a tape recorder operable at any one of a number of record speeds, the speed of recording being in direct relation to the selected camera frame rate, and
(c) wherein said apparatus for independently converting the camera signal to a signal having said second frame rate includes means for varying the number of lines per frame applied to said monitor in inverse relation to the selected camera frame rate.

7. The apparatus of claim 6 wherein
(a) said camera output signal consists of a plurality of parallel video line signals,
(b) said means adapted to play back said recorded signal includes a parallel-to-serial converter for converting the plurality of parallel line signals to a line sequential format for application thereof to said monitor, and
(c) said means for independently converting said camera signal to a signal having said second frame rate includes means for selectively processing particular video line signals through said parallel-to-serial converter.

8. Video frame rate conversion apparatus comprising
(a) a video camera operable at a first frame rate for producing a video signal corresponding to a scene viewed by said camera,
(b) a video monitor operable at a second lesser frame rate, and
(c) means for receiving the camera output video signal for selectively applying predetermined portions of said video signal to said monitor, thereby to down-convert the frame rate of said camera to the frame rate of said monitor, said means for applying predetermined portions of the
camera signal being means for applying signals corresponding to one or more lines from each camera frame to said monitor,
said apparatus further comprising means for selectively applying to said monitor signals corresponding to a different line or lines from each frame of successive groupings of frames.

9. The apparatus of claim 8 wherein the lines corresponding to said selectively applied signals are the same from one frame grouping to the next.

10. The apparatus of claim 9 wherein said camera is operable at a number of frame rates, and wherein said means for selectively applying to said monitor signals corresponding to one or more lines from each camera frame includes means for varying, inversely with respect to the frame rate of said camera, the number of line signals from any given camera frame that are applied to said monitor.

11. Video frame rate conversion apparatus comprising
(a) a vide camera operable at a first frame rate,
(b) a video monitor operable at a second lesser frame rate, and
(c) means for receiving said camera signal and for selectively applying to said monitor signals representing a different line or lines from successive groupings of frames of the camera signal, each said grouping consisting of the same number of frames,
the number of selectively applied lines per camera frame times the number of frames in each grouping thereof constituting the number of video lines per frame of the display of said monitor.

12. The apparatus of claim 11 wherein
(a) said camera output signal consists of a plurality of parallel video line signals, and
(b) said means for receiving said camera output signal includes (1) a parallel-to-serial converter for converting the plurality of parallel line signals to a line sequential format for application thereof to said monitor, and (2) means for selectively processing particular video line signals through said parallel-to-serial converter.

13. The apparatus of claim 12 wherein
(a) said camera is selectively operable at any of a number of frame rates, and
(b) said means for receiving said camera signal further includes means for varying the number of lines per frame applied to said monitor in inverse relation to the selected camera frame rate.

* * * * *